UNITED STATES PATENT OFFICE.

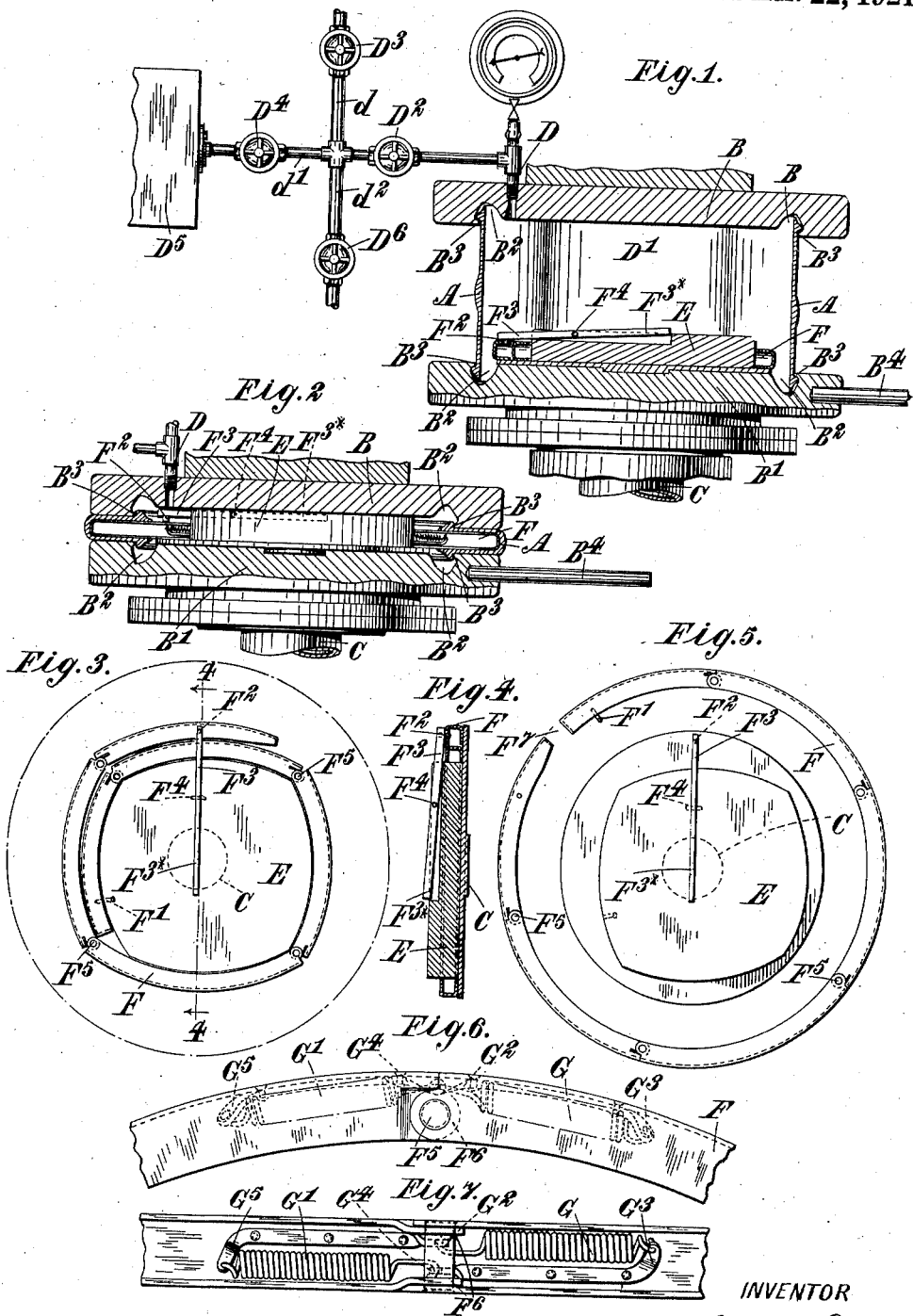

THOMAS SLOPER, OF DEVIZES, ENGLAND.

METHOD OF MANUFACTURING THE COVERS OF PNEUMATIC TIRES.

1,372,567.   Specification of Letters Patent.   Patented Mar. 22, 1921.

Application filed February 12, 1920. Serial No. 358,217.

*To all whom it may concern:*

Be it known that I, THOMAS SLOPER, a subject of the King of England, residing at Devizes, Wiltshire, in England, have invented certain new and useful Improved Methods of Manufacturing the Covers of Pneumatic Tires, of which the following is a specification.

This invention relates to methods of manufacturing the covers of pneumatic tires.

Generally speaking, a tire-cover, that is to say, the restraining fabric for an inner pneumatic tube, is partially vulcanized on a drum or former, the surface of which is approximately flat in a direction parallel to its axis. A flat flexible endless band is thus obtained which is subsequently, before the final vulcanizing process, expanded into the form which it is desired that it shall have. Methods adopted heretofore for expanding the band, in which appliances, such as a mechanically expanded ring, have been used, however, have been found to produce local strains in the substance of the cover, which frequently develop into premature defects when the tire is in use.

By the term "flat band" as applied above, is meant a band of which the inner surface is approximately flat in cross-section, although the thickness of such a band is not necessarily uniform, and its outer surface, which eventually forms the tread of the tire, may be ribbed or otherwise formed in the usual manner.

It has previously been proposed to bring these tire-bands to approximately tire-cover shape by mounting the flat annular band on a drum with a collapsed pneumatic tube disposed in a channel in the face of the drum, and then pushing the edges of the band toward each other as the pneumatic tube is inflated. With this arrangement there is no means for preventing stretch of the edges of the tire-band except their own construction and there is no means for keeping the tire-cover in shape during vulcanization unless the inflated tube remains in it, which is a costly method because the tubes are destroyed by the repeated heating after use with a few covers.

The object of the present invention is to provide an improved method of shaping the covers of pneumatic tires, whereby a "flat" endless band can be expanded to the desired size without producing local strains in the material of the band, and whereby the expanded band can be retained for vulcanizing purposes in its expanded condition mechanically, that is to say without the use of any pneumatic means such as an inflated tube, so that the above mentioned drawback attaching to the use of such tubes is obviated.

The invention will now be described with reference to the accompanying drawings which show one form of apparatus adapted for carrying the improved method into practice. In said drawings:—

Figure 1 is a central vertical section through the apparatus with the tire-band in place but not yet subjected to fluid-pressure;

Fig. 2 is a section through the apparatus with the parts in the position occupied when the tire band is expanded under fluid-pressure and the retaining-ring has been released therein;

Fig. 3 is a plan of the retaining-ring and its restraining and releasing mechanism;

Fig. 4 is an elevation of the same;

Fig. 5 is a plan of the parts shown in Fig. 3 but with the retaining-ring expanded;

Fig. 6 is a side elevation of part of the retaining-ring showing the arrangement of the springs therein;

Fig. 7 is a view of these parts from within the ring.

The same letters indicate the same parts throughout the drawings.

The flat tire-band A is built up in the usual manner on a drum or former, and is preferably partially vulcanized before inserting it between the plates B, B¹. These plates are provided with recesses B² to receive the edges of the tire-band, and the top plate is fixed to the head of a press and the bottom plate is carried by a ram C. The outer edge B³ of each recess is shaped to provide a lip which bears against the outer face of the band at the point where the bead adjoins the main body of the band, and the recess is shaped to allow room for the bead to swing around as the center of the band is expanded outward in the manner hereinafter described.

A conduit D is provided for supplying air under pressure to the chamber D¹ formed by the plates B, B¹ and the tire-band A. The conduit has a controlling-cock D² beyond which are three branches $d$, $d^1$, $d^2$ respectively. The branch $d$ communicates through a cock D³ with means not shown in the drawings for supplying high-pressure air. The branch $d^1$ communicates through a cock D⁴ with an air-reservoir D⁵ in which an auxiliary supply of air is stored. The branch d² is for blowing off only by means of a cock D⁶.

The bottom plate B¹ is arranged to be moved angularly about the ram C, that is circumferentially relatively to the tire-band A and to enable it to be so moved it is provided with a radially-projecting lever B⁴.

Resting on the plate B¹, and if desired made integral therewith, is a central block E encircled by an expansible ring F which is divided at one point.

When the parts are in the position shown in Fig. 1, the expansible ring is coiled around the block with its ends overlapping, as shown in Fig. 3, and is restrained from assuming its circular form by means of an approximately radial pin F¹ on the end-segment which is innermost, which pin enters a hole in the side of the block. The outer end is restrained by a pin F² which is perpendicular to the plane of expansion of the ring and engages a hole in the side of the outer overlapping end. This pin is carried by a lever F³ which constitutes the releasing means for the ring, the said lever being pivoted in the block at F⁴ and arranged so that its free end F³* projects above the block when the pin F² is in position for engaging the ring.

The ring is composed of a number of channeled segments, see Figs. 4, 6 and 7, which are hinged end-to-end about pivot-pins F⁵. The segments are disposed with their channeled sides toward the center of the ring and the side walls of each channeled segment are bent toward each other at one end as shown at F⁶, Fig. 7, to lie between those of the adjacent segment to serve as ears whereby the two segments can be connected by the pivot-pin F⁵. The pivot-pin lies toward the inner edge of the ring and the outer edges of the segments butt against each other to limit the degree of expansion permitted.

Springs G and G¹ are disposed one at each side of each pivot-pin and within the channels of the segments. One end of the spring G is connected to an ear-piece G² secured to the left-hand segment shown in Fig. 7, and the other end of the same spring is connected to an ear-piece G³ secured to the right-hand segment shown in Fig. 7. The spring G¹ has one end connected to an ear-piece G⁴ secured to the right-hand segment and the other end of this spring is connected to an ear-piece G⁵ secured to the left-hand segment. The ear-pieces G² and G⁴ lie on the outer side of the pivot-pin F⁵, so that the springs tend always to bring the segments into the position shown in Figs. 5 and 6. When in this position the ring is fully expanded and the two segments whose adjacent ends are not connected together, are provided with flat butting faces so that they can butt one against the other.

The operation of this apparatus is as follows:—

A tire-band having been placed in position between the plates B, B¹, the plate B¹ is advanced by the ram C toward the plate B and at the same time air is admitted under pressure from the reservoir D⁵ by opening the cocks D⁴ and D², and cocks D³ and D⁶ being closed. This admission of air tends to expand the tire-band A and also presses it against the lips B³ of the plates B, B¹, to effect a proper seal therewith. As the plate B¹ is advanced toward the plate B, the pressure of the air increases in the chamber formed by the plates and the tire-band, so that the center of the tire-band is thrust outward, whereby the desired shaping is effected. During this operation, the expansible retaining-ring F is held in the contracted position by its restraining means, as shown in Figs. 1 and 3, but when the plate B arrives at the limit of its movement and the tire-band A is fully stretched, the free end of the releasing lever F³ comes into contact with the plate B, so that the lever is rocked about its pivot F⁴, and the pin F² at the other end is thereby brought out from engagement with the ring F. The ring thus being released, immediately expands under the action of its springs to the circular form shown in Fig. 5, in which form it fills the annular space constituted by the shaped central portion of the tire-band. The ends of the ring then gap apart as shown at F⁷, but when the air-pressure is released, the tire-band contracts and causes the ends of the ring to butt one against the other, so that the ring then constitutes a rigid hoop-like strut within the tire-band.

After the expansible ring has been brought into position, the cock D⁴ is closed and the cock D⁶ is opened to relieve the pressure, the plates are then separated, and the shaped tire-cover is removed on the ring, and with the ring still *in situ* can be finally vulcanized.

For tires of large cross-section, it may not be found necessary to admit air under pressure to the chamber between the plates, as the relative movement of the plates being greater than for tires of smaller cross-section as will be understood, the approach of one toward the other so rapidly raises the pressure in the chamber that a sufficiently fluid-tight joint may be secured immediately and the further approach of one plate to the other raises the pressure sufficiently to effect the required expansion without any initial pressure being set up before movement of the one plate toward the other commences; in fact, a relief-valve may be provided so that some air may escape to prevent undue pressure being set up.

In the case of small tires, air may first be admitted from the reservoir D⁵ during the movement of the plate B¹ as already described, and then the cock D⁴ may be closed and the cock D³ opened, so that air at higher pressure is admitted to the chamber D¹. After the tire-band has been shaped and the cock D³ closed, the cock D⁴ may be opened to admit some of the air under pressure from the chamber D¹ to the reservoir D⁵, so as to economize in compressed air, but as soon as a balance is obtained, the cock D⁴ is closed and the blow-off cock D⁶ opened.

The cock D² is used to shut off the conduit D when the reservoir D⁵ is being charged through the cock D³.

When the tire-band is made up of one or more layers of diagonal threads, it may be found desirable in the case of large sizes of tire to turn one plate relatively to the other to equalize the tension on the threads, and for this purpose one of the plates is arranged so that it may be revolved in relation to the other when the lever B⁴ is used. It will be appreciated that as the tire-band is shaped, the angle at which the threads cross from side to side of the band is slightly altered and the movement of the plate allows for this alteration of angle.

To get a proper seal at starting between the plates and the edges of the tire-band, it may sometimes be desired to use packing-strips in the recesses of the plates.

It will be seen that in the apparatus according to this invention, the edges of the tire-band always have their outer faces in engagement with the edges of the grooves or recesses in the plates, so that the edges are not only held in the required position but no expansion of the same can take place even should the build of the edges be such as would allow of stretching.

The use of the retaining-ring enables the tire-bands to be vulcanized in an expanded condition without the aid of a pneumatic tube, and as the retaining rings can be used almost indefinitely, a considerable saving of cost of manufacture results as compared with apparatus wherein a pneumatic tube has to be used to keep the tire-band in shape during vulcanization, for these tubes, as is well-known, do not last long when so used and they are expensive.

It will be appreciated that various means may be employed for releasing the restraining-means of the retaining-ring, and the operation of the same may be variously effected. As shown, the operation of the release from without the chamber is effected by the movement of the plate B¹, but the lever or other releasing-device could be operated by means extending through a gland in one of the plates. Similarly, various forms of catches could be used for securing the two ends of the ring F instead of the pins F¹ and F²; also the expansible ring itself can be variously constructed, all that is required being that it shall be capable of being made to occupy a smaller area than that of the tire-band before it is expanded and of expanding to fit the tire-band and hold it extended after it is expanded.

It will be seen that tires shaped by the method described and which consists in expanding the central portion of the tire by the direct action of fluid-pressure and retaining it in this expanded condition for vulcanizing purposes by means of a device which is brought into operative position within the tire-band while the latter is in the expanded condition, have corresponding parts all around their circumference subjected to equal strain in manufacture, as the cover, with the exception of the edges, is free while it is being shaped so that the different parts can aline themselves.

The retaining-ring may obviously be variously made and could for example take the form of a number of segmental parts moved out radially by a suitable mechanism; such devices are already well-known as used for collapsible formers and therefore need not be described in detail. The retaining-ring in whatever form it takes may be arranged to expand as the central portion of the tire expands, instead of being first restrained and then released when the band has been fully expanded; for example, the ring F could be used without the restraining and releasing means described, the ring being merely coiled up within the tire-band so that it can follow the same as this expands, until it finally assumes the position shown in Fig. 2.

In wired-on tires, the engagement between the edges of the recessed plates and the bead need not be depended upon to hold the edges against radial expansion as in fact the parts of the tire-band which bear against these lips may in some cases be flat as the wires prevent undue radial expansion.

It will be understood that by "the direct action of fluid pressure" in the specification and claims, is meant that the fluid is so applied to the interior of the cover that no separate air-container such as an inner tube is required.

The term "fluid-tight joint" as used throughout the specification and claims for the joint made between the tire-band and plates, is intended to cover such a joint as is sufficiently fluid-tight for the purpose. In actual practice a slight leakage is immaterial; obviously the pressure within the tire-band may be obtained by creating a vacuum outside the band if desired.

What I claim as my invention and desire to secure by Letters Patent is:—

1. In the method of making a pneumatic tire cover, the steps of expanding to the desired size the central portion of a "flat" endless tire-band around an expansible contracted non-pneumatic member under the pressure of a fluid in direct contact with the inner surface of the band, positioning said expansible member to receive and retain the expanded band in its expanded condition, releasing the fluid pressure from the inner surface of the band and thereby retaining the expanded band in its expanded condition on said member, and vulcanizing the band while it is thus mechanically retained expanded, substantially as described.

2. In the method of making a pneumatic tire cover, the steps of expanding the central portion of a "flat" endless tire band around a contracted expansible member under the pressure of a fluid in direct contact with the inner surface of the band to the desired size, said expansible member being normally urged by a force tending to expand it, releasing the expansible member and thereby retaining the expanded band in its expanded condition, and vulcanizing the band while the same is thus retained in its expanded condition.

3. In the method of making a pneumatic tire cover, the steps of expanding the central portion of a "flat" endless tire band around a contracted expansible member under the pressure of a fluid in direct contact with the inner surface of the band to the desired size, which expansible member is normally urged by a force tending to expand it, automatically releasing the expansible member after the band has been expanded and thereby retaining the expanded band in its expanded condition, and vulcanizing the band while the same is retained in its expanded condition.

4. In the method of making a pneumatic tire cover, the steps of retaining and sealing the edges of the sides of a "flat" endless tire band surrounding an expansible contracted member in closure members which close the sides of the band and form with the band a closed chamber having a diameter equal to that of the band, increasing the fluid pressure in said chamber and thereby expanding the central portion of the band to the desired size, positioning said expansible member to receive and retain the expanded band in its expanded condition, releasing the fluid pressure from the inner surface of the band and thereby retaining the expanded band in its expanded condition on said member and vulcanizing the band while it is thus retained expanded, for the purpose specified.

5. In the method of making a pneumatic tire cover, the steps of retaining and sealing the edges of the sides of a "flat" endless tire band surrounding an expansible contracted member in closure members which close the sides of the band and form with the band a closed chamber having a diameter equal to that of the band, increasing the fluid pressure in said chamber by forcibly advancing one of said closure members toward the other, whereby the capacity of the chamber is reduced, and thereby expanding the central portion of the band to the desired size, positioning said expansible member to receive and retain the expanded band in its expanded condition, releasing the fluid pressure from the inner surface of the band and thereby retaining the expanded band in its expanded condition on said member and vulcanizing the band while it is thus retained expanded, for the purpose specified.

6. In the method of making a pneumatic tire cover, the steps of retaining and sealing the edges of the sides of a "flat" endless tire band in closure members which close the sides of the band and form with the band a closed chamber having a diameter equal to that of the band, increasing the fluid pressure in said chamber by forcibly advancing one of said closure members toward the other and admitting a fluid under pressure into said chamber, and thereby expanding the central portion of the band to the desired size, mechanically retaining the expanded band in its expanded condition by pressure applied on the inner surface of the band, and vulcanizing the band while it is thus retained expanded, for the purpose specified.

7. In the method of making a pneumatic tire cover, the steps of expanding to the desired size the central portion of a "flat" endless band under the pressure of a fluid in direct contact with the inner surface of the band which forms the periphery of a closed chamber whereof its side walls are rigid and one can be forcibly advanced toward the other, automatically mechanically retaining the expanded band in its expanded condition, and vulcanizing the band while it is thus retained expanded, for the purpose specified.

In testimony whereof I affix my signature.

THOMAS SLOPER.